United States Patent [19]
Matsui

[11] Patent Number: 4,633,883
[45] Date of Patent: Jan. 6, 1987

[54] ULTRASONIC DIAGNOSTIC EQUIPMENT

[75] Inventor: Yutaka Matsui, Yokohama, Japan

[73] Assignee: Kabushiki Kaisha Toshiba, Kawasaki, Japan

[21] Appl. No.: 699,674

[22] Filed: Feb. 8, 1985

[30] Foreign Application Priority Data

Feb. 16, 1984 [JP] Japan ................. 59-025983

[51] Int. Cl.$^4$ ............................................. A61B 10/00
[52] U.S. Cl. ..................................... 128/660; 73/597; 73/602
[58] Field of Search .............................. 128/660, 661; 73/597–598, 602–603

[56] References Cited

U.S. PATENT DOCUMENTS 4,170,142  10/1979  Posakony et al. ................... 73/603
4,531,411  7/1985   Collins et al. ...................... 73/603

OTHER PUBLICATIONS

Ogawa et al., Third International Congress on the Ultrasound Examination of the Breast, No. 18, p. 34, Jun. 10–12, (Tokyo 1983).
Robinson et al., 28th Annual Meeting of the American Institute of Ultrasound in Medicine, Abstract #439, Oct. 18–21 (NY 1983).
Nishimura et al., Japanese Journal of Medical Ultrasonics, Proceedings of the 44th Meeting, 44–B–5, Jun. 8–10 (Tokyo 1984).

*Primary Examiner*—Kyle L. Howell
*Assistant Examiner*—Francis J. Jaworski
*Attorney, Agent, or Firm*—Schwartz, Jeffery, Schwaab, Mack, Blumenthal & Evans

[57] ABSTRACT

The ultrasonic diagnostic equipment in accordance with the present invention is constructed so as to detect the phase shift of the received signal of an ultrasonic wave transmitted by an ultrasonic transducer and reflected by an object in order to find the hologram signal for the object, and to obtain the reconstructed data for the object by carrying out the synthetic aperture operation by using the hologram signal and a kernel signal, and furthermore, it is arranged so as to detect the variations in the maximum amplitude value of the reconstructed result by varying the kernel signal relative to the hologram signal of the object, and to find the velocity of the ultrasonic wave from the kernel signal that gives rise to the largest maximum value of the amplitude.

7 Claims, 2 Drawing Figures

ULTRASONIC DIAGNOSTIC EQUIPMENT

BACKGROUND OF THE INVENTION

1. Field of the Invention

The present invention relates to an ultrasonic diagnostic device which is capable of computing the velocity of an ultrasonic wave by means of the synthetic-aperture method.

2. Description of the Prior Art

Presently, research is thriving in the field of so-called tissue characterization which is aimed at the quantification of tissue characteristics according to the variations of physical quantities which are sustained by an ultrasonic wave when it propagates through tissues of a living body. In the above research, velocity has been chosen as a representative physical quantity of ultrasonic waves, and measurements have been made by means of the prior art measuring method which utilizes the transmitted wave.

However, this method has a drawback in that the measurement of the velocity is not carried out by the use of the ultrasonic diagnostic equipment which is currently in use. For this reason, there has been a demand for a method which permits measurement of sound velocity by the reflection measurement through the use of echo signals.

SUMMARY OF THE INVENTION

An object of the present invention is to provide an ultrasonic diagnostic equipment which permits determination of the average velocity of the ultrasonic wave by the ultrasonic pulse reflection method.

Another object of the present invention is to provide an ultrasonic diagnostic device which permits measurement of the velocity of the ultrasonic wave by utilizing the technique of the synthetic aperture method.

In order to achieve the above objects, the ultrasonic diagnostic device in accordance with the present invention includes an ultrasonic transducer which is driven by a pulser so as to transmit an ultrasonic wave and receive the reflected ultrasonic wave from an object, a phase detector which obtains a hologram signal for the object by detecting the phase shift of the signals received by the ultrasonic transducer, a signal generator which generates reference signals required for synthetic aperture processing that uses the depth of the object as the parameter, and an operational unit which determines the reconstructed data for the object by carrying out synthetic aperture method by the use of the kernel signal and the hologram signal.

Moreover, the ultrasonic diagnostic device is equipped with a control unit which controls the operational unit and the signal generator so as to detect the maximum value of the amplitude of the reconstructed data obtained by varying the kernel signal for the hologram signal, a comparator which compares the maximum values of the amplitude, and a sound velocity computing unit which computes the velocity of the ultrasonic wave from the result of the comparison.

BRIEF DESCRIPTION OF THE DRAWING

These and other objects, features, and advantages of the present invention will be more apparent from the following description of a preferred embodiment taken in conjunction with the accompanying drawings in which.

DESCRIPTION OF THE PREFERRED EMBODIMENT

Figure 1:
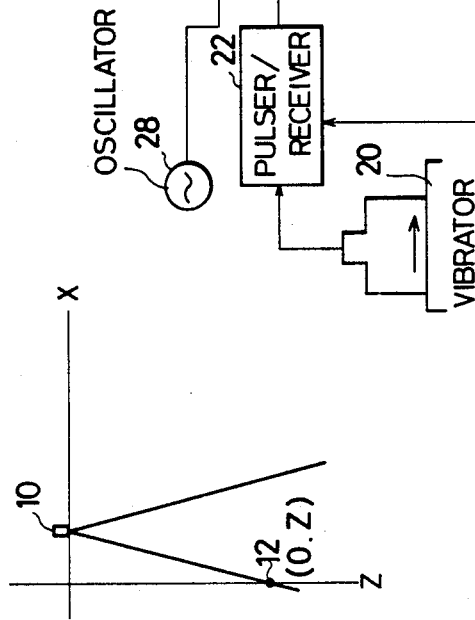
FIG. 1 is a simplified diagram for illustrating the scanning principle in the synthetic aperture method.

Referring to FIG. 1, there is shown the scanning principle used in the synthetic aperture method. As shown, an ultrasonic transducer 10, which is moved and scanned in the x-axis direction, transmits ultrasonic pulses in the z-axis direction toward an object 12, and receives the wave reflected by the object 12. If the coordinates of the point for transmission and reception of the ultrasonic pulses by the ultrasonic transducer 10 are (x, o), and the coordinates of the location of the object which is assumed to be a point reflector are (o, z), then the reflected wave received by the ultrasonic transducer 10, namely, the received signal, S is given by the following equation.

$$S = f(t - t_n) \sin \omega_o (t - t_n) \quad (1)$$

In the above equation, f(t) represents the envelope of the ultrasonic pulse, and tn is given by $$t_n \approx \frac{2z}{V} + \frac{x^2}{zV},$$

where V is the velocity of the ultrasonic wave. It should be noted that the depth z of the point reflector is assumed to be sufficiently large compared with the position x of the ultrasonic transducer 10 (z >> x). In addition, $\omega_o$ is given by $$\omega_o = 2\pi f_o$$

in terms of the center frequency $f_o$ of the ultrasonic wave.

From the above, using reference signals with phase difference of 90°, each of the corresponding phase shift of the received signals is detected, and the high frequency component is removed by passing them through low-pass filters, to obtain mutually orthogonal signals $S_R$ and $S_I$ that form the hologram components.

$$S_R = S \cos \omega_o t, \quad S_I = S \sin \omega_o t$$

In terms of these signal components, the hologram signal $S_o$ for the reflector is given by $$S_o = S_R - jS_I = \tfrac{1}{2} f(t - t_n) \exp(-j\omega_o t_n) \quad (2)$$

The calculation of the reconstructed image A for the point reflector by means of the aperture synthesis method is accomplished by convolving the kernel signal $S_c$ given by $$S_c = \exp\left[ j\omega_1 \frac{(x - s)^2}{zV} \right] \quad (3)$$

for the hologram signal $S_o$ shown in Eq.(2) above, and then taking the absolute value of the result. Here, the kernel signal given in the above is the kernel for the convolution operation. Further, $\omega_1$ is given by $\omega_1 = 2\pi f_1$ in terms of the fundamental frequency $f_1$ of the kernel signal. Therefore, with interval of integration, the reconstructed image A is shown as follows.

$$A = \left| \int_{-\frac{l}{2}+s}^{\frac{l}{2}+s} S_o \times S_c dx \right| = \tag{4}$$

$$= \left| \int_{-\frac{l}{2}+s}^{\frac{l}{2}+s} \frac{1}{2} f(t - t_n) \exp\left[ -j\omega_0 \left( \frac{2z}{V} + \frac{x^2}{zV} \right) \right] \cdot \exp\left[ +j\omega_1 \frac{(x-s)^2}{zV} \right] dx \right|$$

$$= \left| \int_{-\frac{l}{2}+s}^{\frac{l}{2}+s} \frac{1}{2} f(t - t_n) \exp\left[ -j\omega_0 \frac{2z}{V} \right] \cdot \exp j \left[ \frac{-\omega_0 x^2 + \omega_1(x-s)^2}{zV} \right] dx \right|$$

Usually the frequency of the ultrasonic wave is constant, and the fundamental frequency $f_1$ of the kernel signal is generally set to be equal to the center frequency $f_o$ of the ultrasonic wave so that $\omega_o = \omega_1$ is given and the reconstructed image A in the above may be represented by $$A \approx f(t - t_n) \left| \frac{\sin(2\pi ls/\lambda z)}{2\pi s/\lambda z} \right| \tag{5}$$

Although in the synthetic aperture method, the hologram data which runs along the hologram signal pattern, namely, the data which is corrected for the range coverture compensation is usually used, the present computation will be carried out using the hologram data uncorrected for the range coverture compensation because of the time for processing becomes too long and the hardware constitution becomes too complicated in use of the former hologram data.

When the velocity of the ultrasonic wave and the velocity set in the kernel signal are unequal, that is, when the velocity set in the kernel signal deviates from the velocity of the ultrasonic wave by an amount $\Delta V$, the reconstructed image A will be found from Eq.(4) as $$A = \left| \int_{-\frac{l}{2}+s}^{\frac{l}{2}+s} \frac{1}{2} f(t - t_n) \exp\left[ -j\omega_0 \left( \frac{2z}{V} + \frac{x^2}{zV} \right) \right] \cdot \tag{6}$$

$$\exp\left[ +j\omega_0 \frac{(x-s)^2}{z(V-\Delta V)} \right] dx \right|$$

$$= \left| \int_{-\frac{l}{2}+s}^{\frac{l}{2}+s} \frac{1}{2} f(t - t_n) \exp\left[ -j\omega_0 \left( \frac{2z}{V} - \frac{s^2 V}{zV(V-\Delta V)} \right) \right] \cdot \exp\left[ +j\omega_o \frac{-2sVx + \Delta Vx^2}{z(V-\Delta V)} \right] dx \right| \tag{6'}$$

It is seen from the result that the image is affected to the extent as represented by presence the terms involving $\Delta V$ in the second exponential terms of Eq.(6)'. In other words, the reconstructed image is deteriorated by the amount due to the velocity deviation $\Delta V$.

The present invention has been proposed in consideration of this situation, which is to estimate the velocity of the ultrasonic wave based on the degree of deterioration of the reconstructed image. Namely, the denominator of the exponent in the exponential function for the kernel signal of Eq.(6) may be rewritten as $$Z(V - \Delta V) = z'V, \tag{7}$$

where $z'$ is given by $$z' = z\left(1 - \frac{\Delta V}{V}\right) \tag{8}$$

$$\Delta V = \frac{V(z - z')}{z} \tag{9}$$

As shown by Eq.(7), when the velocity of the ultrasonic wave is shifted by an amount $\Delta V$, the deterioration of the reconstructed image will disappear if the kernel signal for the depth z is replaced by the kernel signal for the depth $z'$. In other words, when the variations in the maximum value of the amplitude is detected by varying the kernel signal for the given hologram signal, the largest maximum value of the amplitude will occur for the kernel signal with the depth $z'$. That is, the depth $z'$ is determined as the depth on which the reconstructed image without deterioration, or the largest of the maximum amplitude, is obtained, and $\Delta V$ is then found from Eq.(9), which in turn makes it possible to determine the velocity of the ultrasonic wave under the situation Next, the concrete construction of an ultrasonic diagnostic device having a synthetic aperture function and an ultrasonic wave velocity computing function in accordance with the present invention will be illustrated.

Figure 2:
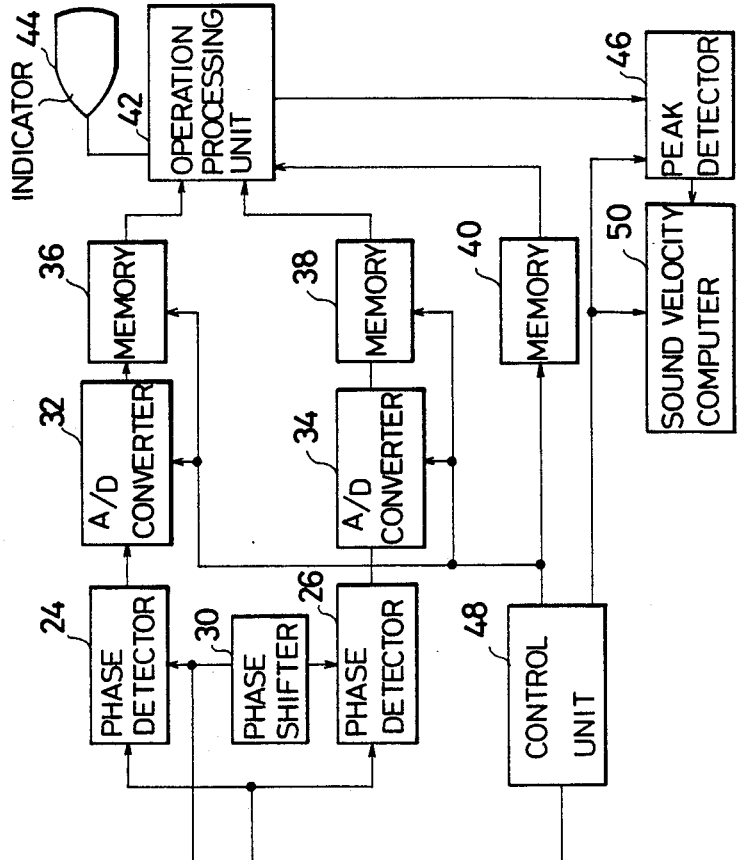
FIG. 2 is a block diagram showing the construction of the ultrasonic diagnostic equipment embodying the present invention.

Referring to FIG. 2, the ultrasonic diagnostic device embodying the present invention includes an ultrasonic transducer 20 which is energized by a pulser 22 to transmit an ultrasonic pulse with certain spread, and receive the reflected wave of the ultrasonic pulse from a reflector. The reflected signal is amplified to a required level via a receiver. Phase detectors 24 and 26 detect the phase shifts of the received signal by accepting each of the two signals with phase difference of 90° which consist of a sine wave signal supplied by an oscillator 28 and another sine wave signal that is obtained by shifting the phase of the wave from the oscillator 28 by 90° through a phase shifter 30. Here, the sine wave signals are set to have a frequency which is equal to the resonance frequency of the ultrasonic transducer 20, and the high frequency components of the signals whose phase shifts are detected have been removed by the low-pass filter which is built in the detector when they are output.

As a result, there are obtained from the two phase detectors 24 and 26 a cosine hologram signal and a sine hologram signal which are mutually orthogonal. After they are each digitized via the A/D converters 32 and 34 they are stored in memories 36 and 38. A memory 40 memorizes a plurality of kernel signals corresponding to the various values of the depth 2 as a parameter. An operation processing unit 42 comprising a microprocessor carries out the operational process for synthetic aperture indicated by Eq.(6) based on the information coming from the memories 36, 38, and 40, and displays the reconstructed image A thus obtained on an indicator 44. At the sametime, the operation processing unit 42 detects the maximum value of the amplitude, and transfers the data to a peak detector 46. A control unit 48 is adapted for supplying the peak detector 46 with the variations in the maximum value of the recorded image which are obtained by feeding the kernel signal to the operation processing unit 42 in succession, and controls a series of actions of the various parts involved in this operation. The peak detector 46 carries out the detection of the largest maximum value in the amplitude of the reconstructed image obtained by varying the depth of the kernel signal, and the corresponding depth $z'$ of the kernel signal is transferred to a sound velocity computer 50. At the sound velocity computer 50, the velocity of the ultrasonic wave is computed by the use of Eq.(8), and the result is displayed.

As described in the foregoing, the computation of the velocity of the ultrasonic wave according to the present device is easy, and the method is very effective.

Furthermore, it should be mentioned that the calculation of the sound velocity is of course possible not only by the use of the complex conjugate of the hologram signal as shown by Eq.(2) but also by a reference signal such as $$S_c' = \exp\left(-j\omega_1 \frac{(x-s)^2}{zV}\right) \quad (3)'$$

Various modifications will become possible for those skilled in art after receiving the teaching of the present disclosure without departing from the scope thereof.

What is claimed is:

1. An ultrasonic diagnostic device for examining an object with an ultrasonic wave in order to determine, from a reflected wave, reconstructed data of said object and a velocity of the ultrasonic wave, comprising:
   means for transmitting an ultrasonic wave to said object and for receiving a reflected ultasonic wave from object to provide a received signal;
   means for processing said received signal of the reflected wave, said processing means comprising a first means for varying a kernel signal to provide varied kernel signals as a function of a depth of said object and a second means for convolving said varied kernel signals with said received signal according to a synthetic aperture method in order to obtain a plurality of reconstructed data signals; and
   velocity computing means for analyzing said reconstructed data signals in order to determine the velocity of the transmitted ultrasonic wave.

2. An ultrasonic diagnostic device as claimed in claim 1, wherein said transmitting receiving means includes:
   a detector means for detecting a phase shift of the reflected wave and for generating a hologram signal as said received signal in accordance therewith;
   said processing means comprising a signal generator means for generating said kernel signal as a function of a depth of said object; and said second means comprising
   an operation controlling unit means for carrying out said synthetic aperture operation using said varied kernel signals and said hologram signal in order to obtain said plurality of reconstructed data signals with associated peak amplitude values.

3. An ultrasonic diagnostic device as claimed in claim 2, wherein said operation controlling unit means comprises;
   an operational unit means for carrying out a part of said synthetic aperture operation using one of said varied kernel signals and said hologram signal; and
   a controlling unit means for controlling said signal generator means and said operational unit means.

4. An ultrasonic diagnostic device as claimed in claim 1, wherein said velocity computing means comprises;
   a peak value detecting means for detecting a reconstructed data signal with a maximum peak value amplitude from among said reconstructed data signals, means for outputting a depth parameter value corresponding to said detected reconstructed data signal having said maximum peak value amplitude, velocity of the ultrasonic wave according to said output depth parameter value.

5. An ultrasonic diagnostic device as claimed in claim 1, further comprising:
   means for displaying a reconstructed image according to the reconstructed data sent from said processing means.

6. An ultrasonic diagnostic device as claimed in claim 1, wherein said first means comprises a plurality of memory means for storing a plurality of kernel signals having varied depth parameter values corresponding to said varied kernel signals.

7. An ultrasonic diagnostic device for examining an object with an ultrasonic wave in order to determine the reconstructed data and a velocity of the ultrasonic wave from a reflected wave, comprising:
   means for transmitting an ultrasonic wave to the object and for receiving a reflected ultrasonic wave from the object;
   a phase detector means for detecting a phase difference of a received signal of the reflected wave and for generating a hologram signal for the object;
   a signal generator means for varying a kernel signal as a function of a depth of the object and for providing varied kernel signals;
   operation controlling unit means for carrying out a synthetic aperture operation using said varied kernel signals and the hologram signal, in order to obtain a plurality of reconstructed data signals with varied peak amplitude values corresponding to said varied kernel signals;
   peak detecting means for detecting the reconstructed data signal having maximum peak amplitude and for identifying its corresponding kernel signal depth parameter; and
   a sound velocity computer means for computing said velocity of the ultrasonic wave as a function of said corresponding kernel signal depth parameter.

* * * * *